Dec. 15, 1953  A. M. THOMSEN  2,662,811
METHOD OF MAKING AMMONIUM SULPHATE
Filed Feb. 12, 1951
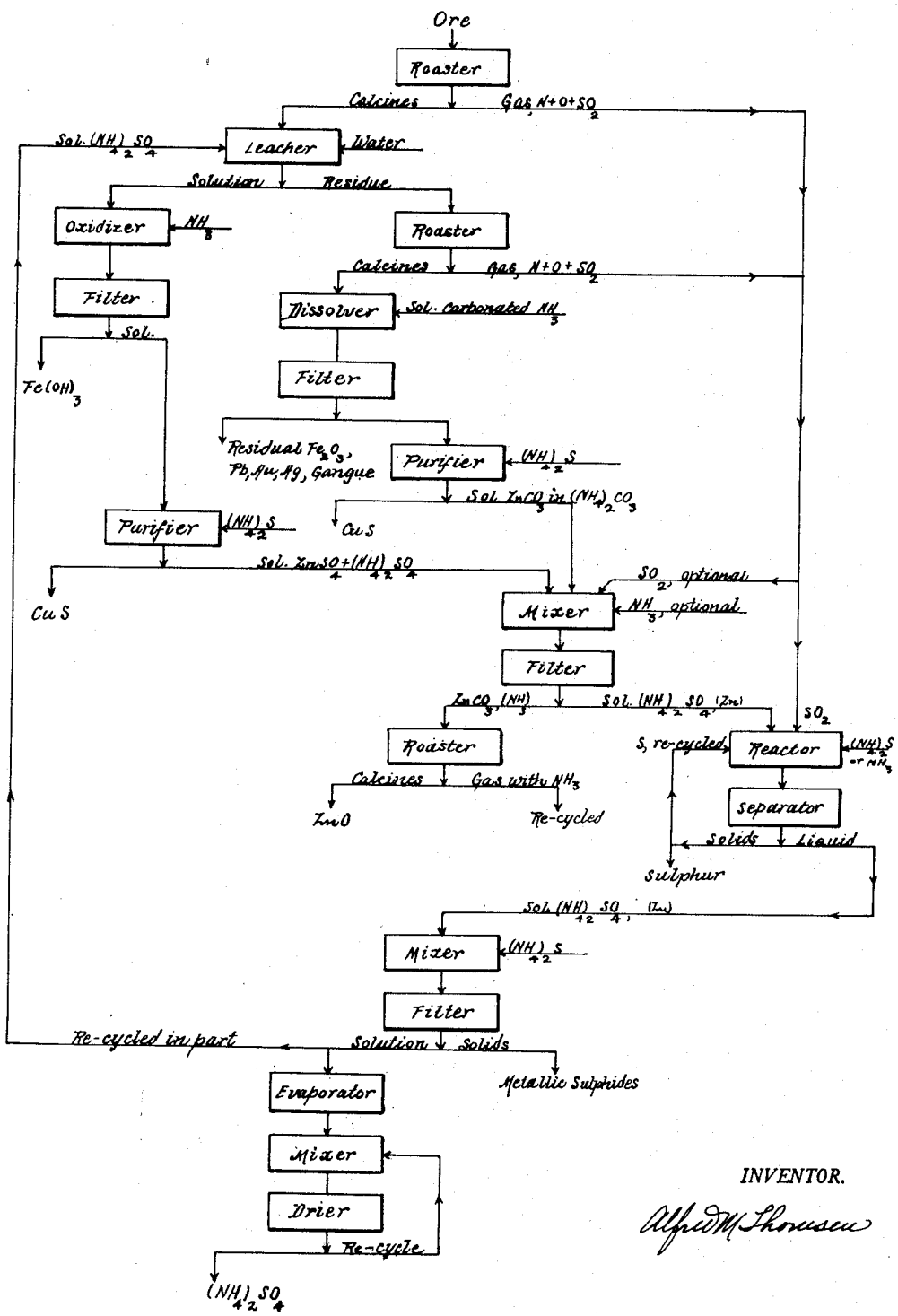
INVENTOR.
Alfred M. Thomsen Patented Dec. 15, 1953

2,662,811

UNITED STATES PATENT OFFICE 2,662,811

METHOD OF MAKING AMMONIUM SULPHATE

Alfred M. Thomsen, San Francisco, Calif.

Application February 12, 1951, Serial No. 210,477

3 Claims. (Cl. 23—119)

Recent advances in the ammonia industry, due to the synthesis of ammonia from nitrogen and hydrogen, have profoundly altered the relative economic status of ammonia gas and its compounds. Some thirty years ago the primary market form of ammonia was the sulphate, due to its derivation from coal and coke oven gas by washing same with sulphuric acid in order to recover the resident ammonia as ammonium sulphate. Today the cheapest form of ammonia is the gas itself and all other compounds are derived from it as the primary source. While there is still a large production of "direct sulphate" from coal as heretofore, much synthetic ammonia is converted into sulphate at considerable expense; in spite of the inroads made by phosphate and nitrate, it is still a prime favorite.

My process deals with a way in which this conversion is made to serve a double purpose, the sulphur required being furnished by natural sulphides while certain metals of high economic value are simultaneously extracted from their primary locus in said metallic sulphides. Simultaneously a considerable percentage of elemental sulphur is produced in recoverable form and adds much to the economic value of my process.

Such recovery of valuable metals has no direct bearing upon my process from a purely technical standpoint but economic considerations present a different aspect. As I say later on, a pure iron pyrite, containing nothing but iron and sulphur, would serve as well but then all costs of making ammonium sulphate must be charged against said sulphate. Contrariwise, if an ore contain but 1% of copper and 3% of zinc, a gross of less than $16.00 per ton, yet that small amount would materially reduce the cost of making 1½ tons of ammonium sulphate, conceivably even doubling the profit on the operation. On such an ore, the principal product would be considered ammonium sulphate, but the recovered metals would form a most appreciated by-product. Inasmuch as bodies of iron sulphide of such composition as here indicated are well known, but considered as worthless, it is obvious that it is the simultaneous use of the sulphur in making ammonium sulphate which confers value on such ore.

The best way to describe my process is to take a special illustration such as I have represented on the attached flow sheet as my preferred illustration of the working of my process though certain steps represented therein may at times be omitted or altered as I will explain later on. In this preferred version I am using as the "ore," any natural sulphide of iron containing for its economic value both copper and zinc.

This ore is first roasted in any conventional manner so as to give a gaseous product containing sulphur dioxide and a calcine containing water soluble sulphates of resident metals as well as insoluble basic sulphates and undecomposed sulphides. Such a roast is well known in the art as a sulphatizing roast and is effected by working at a very low red heat. It has not been much used in recent years because of the very incomplete extraction of the contained metals and also because the leach waters from it contain a great deal of iron. Its main commercial use in bygone years was to render contained silver soluble, but the superiority of cyanide has now largely replaced many of these older processes. However, for the purpose I use it herein it is dependable and valuable.

The calcines are next leached with water in the "leacher" and I have shown a portion of a recycled solution of ammonium sulphate as a portion of the fluid employed for this leaching. Such recycling serves a double purpose. As the final end of my process is a solution of ammonium sulphate, and as this compound is extremely soluble, I can advantageously increase the concentration by such recycling and hence decrease the final amount of evaporation required. Furthermore, such addition of ammonium sulphate adds to the solubility of the basic metallic sulphates contained in the calcines and thus to the total sulphates extracted from this initial roasting.

The incompleteness of this roast-leaching step is no objection in my process for I subject both the resultant solutions and the residue to a series of steps which nullify the former unfavorable aspects of this time honored process. I will first consider the residue. On the flow sheet I pass it on to the next step, which is another roaster, operated at a higher temperature, to wit: a clear red heat. All sulphides are thus decomposed and any remaining sulphur will be present as a basic sulphate which is now no objection. This second roasting step results in a further evolution of sulphur dioxide and calcines in the state generally referred to as a "dead" roast or as a "sulphur-free" roast, though the latter is never quite attained.

These calcines are now treated with what I have designated on the flow sheet as a solution of carbonated ammonia, i. e., a solution of aqua ammonia saturated with the waste chimney gases of the plant, an operation which is entirely conventional. Such a solution removes copper and zinc from the calcines in the form of water soluble complex ammonium carbonate salts, thus giving rise to a second solution and to another residue which is removed. This residue will contain its iron in the form of oxide and may contain commercial quantities of lead, gold, and silver if such were present in the original ore. Its further treatment, or use, if any, is manifestly outside of the scope of this disclosure.

My process as described thus far is thus seen to have produced three products that require further treatment, namely, two solutions and the gas derived in the roasting operations. The first solution, as already indicated, is made up principally of the sulphates of iron, copper and zinc with an indefinite amount of recycled ammonium sulphate. It is first oxidized in any conventional manner, such as by air in a Pachuca tank, and the iron precipitated by the requisite amount of ammonia, which may be carbonated or not as desired.

The amount of ammonia to be added is determined empirically by testing a filtered sample with nitric acid and ammonia until it reacts iron-free. The contents of the tank is then filtered and the precipitate of ferric hydroxide discarded. The filtered solution consists essentially of the sulphates of copper, zinc and ammonium. It now becomes obvious why the large amount of soluble iron is no objection in my use of the sulphatizing roast. Such iron is manifestly as effective as the sulphates of copper and zinc in converting ammonia into its sulphate.

The next step is the separation of the copper from the above described solution. It is effected in the "purifier," the next operation on the flow sheet, by the addition of $(NH_4)_2S$. Any other soluble sulphide could manifestly be used, but in that event either the precipitate of copper sulphide or the solution of ammonium sulphate would become contaminated by the corresponding reaction products. The precipitate is removed by any orthodox means and the resultant solution is now essentially composed of the sulphates of zinc and ammonium. If the ore contain silver it will be possible for much of such metal to pass into solution after roasting and if so then it will be found as a component of the copper sulphide precipitate.

Returning now to the solution in carbonated ammonia previously described, it also enters a "purifier" where its copper is similarly precipitated with ammonium sulphide. The reason for this selective separation of copper as sulphide is that zinc sulphide is somewhat more soluble than copper sulphide in the solution of ammonia salts which by now has become the principal ingredient of the solution. The amount of sulphide required in either purification step is manifestly dependent upon the composition of the ore initially used and must, therefore, be determined empirically by test and addition until the solution is substantially copper-free, after which further additions would only precipitate zinc.

My process has thus far produced two purified solutions that contain essentially zinc and ammonia but entirely different in characteristics; one being a mixture of zinc sulphate and ammonium sulphate while the other is a solution of zinc carbonate in ammonium carbonate. When these two solutions are mixed in proper proportion a heavy, granular precipitate of zinc carbonate is formed representing the major part of the zinc content but a little zinc still remains in the solution. Similarly a little ammonia is retained in the zinc carbonate.

On the flow sheet, I have represented this reaction as taking place in a "mixer" while separation of the precipitate is effected by the use of the filter which follows it. The proportioning of the two solutions is determined empirically but it is not possible to reach completion owing to the limitations of the reaction involved. When a further addition of either one of the reacting solutions produces only a slight precipitate when commingled with a filtered sample of the mixture the result will be satisfactory.

The separated precipitate is then represented as entering a roaster, which may be of any conventional type. Ammonia and carbon dioxide are evolved and a calcine of zinc oxide remains. The gases are scrubbed with water and the ammonia is re-cycled, but as such procedure is entirely orthodox I have not represented it upon the flow sheet.

The filtrate from the zinc carbonate precipitation is now essentially a solution of ammonium sulphate but still retains a little zinc. On the flow sheet this is now represented as entering a device called a "reactor" which may be merely a scrubber with a recycled scrubbing medium. In said scrubber the solution is contacted with the roasting furnace fumes which contain chiefly sulphur dioxide with a little trioxide, some unconsumed oxygen, together with nitrogen, and such combustion products as have been introduced from the fuel used in roasting.

Simultaneously with said commingling additional ammonia must also be added and I prefer to have the mixture so adjusted that the scrubbing medium shall be somewhat basic in character. It is advantageous to equipment that the solution be not permitted to become acid. When equal parts of decinormal sulphuric acid and the filtered scrubbing medium mutually neutralize one another the status is about optimum.

The ammonia may be added as gaseous ammonia, as ammonia water, as the carbonate, and as sulphide as desired. In any event the result is the same, namely a further formation of ammonium sulphate with the separation of suspended elemental sulphur. There is a difference in the relative amounts of sulphur and of sulphate produced in the reaction, so if it be desired to have as large an amount of sulphur as possible then the ammonia should be added in the form of sulphide.

This finely divided sulphur is in part re-cycled and in part separated by filter or centrifuge as desired. It commands a premium in horticulture and the commercial field is quite extensive. It is easily converted into fused brimstone by heating the suspension in ammonium sulphate solution under pressure to a temperature slightly higher than the melting point of sulphur when said melted sulphur settles out completely and may be drawn off at will. I have indicated this reaction between sulphur dioxide and ammonia as "optional" in the preceding step where they are seen entering the mixer if desired. The reason for this step is that precipitation of an unbalanced mixture can be aided by the introduction of either one or the other of these substances. Naturally, it is impossible to so govern a roasting operation so closely that these two formerly described solutions shall be in such volume as to exactly balance in the mixing step, either one or the other will certainly predominate, so the introduction of a little $SO_2$ or $NH_3$ makes a handy way to balance, the latter being carbonated, if desired.

In practice, of course, the need of any such control is obviated by adequate storage of both solutions. It is obvious that too high a temperature in the first roast will cause a corresponding increase in the carbonate solution needed after the second and complete roast. Therefore, by a daily variance in roaster temperature in the first step the approximate relationship can be sustained and correct volumes can be drawn from the respective storage tanks.

The next step on the flow sheet is the purification of the ammonium sulphate solution from the slight amount of zinc still retained therein. This takes place in another "purifier" but I have here split it up into its constituent parts, namely a mixer and a filter. The separated mud is any accidental impurity precipitated as sulphide plus the resident zinc. For all agricultural purposes the slight amount of zinc still remaining is harmless but if it be desired to further purify the solution it can be done by adding the tiny amount of ammonium ferrocyanide needed to separate this last bit of zinc which is due to the solubility of zinc sulphide in an ammonium sulphate solution. This I have omitted from the flow sheet.

The purified ammonium sulphate solution, the object of my process is now dehydrated by evaporation and drying. In general, it will be unnecessary to resort to a previous crystallization but it can be dehydrated in a single operation by commingling a part of the evaporated liquor with a part already dried so as to make a moist mass easily handled in the drier. I have indicated this step by the re-cycling of a part of the dried product to a mixer in which it is mixed with the still liquid item. I have also shown the re-cycling of a part of the ammonium sulphate solution back to the "leacher" as already described previously. The dried product issuing from my process will be in the form of spheroidal particles of agglomerated crystals and will be what the trade designates as "free flowing."

I have now described a preferred version of my process and the greatest extent to which I can make use of the special merits contained therein, but it is evident that sundry parts can exist by themselves, without forming a part of the entire disclosure. Thus, the first roasting step can be used by itself by precipitating zinc after the copper has been removed by the sulphide step used by me later on after commingling and carbonate separation. It will be imperfect but it will work to some extent.

It will also be possible to eliminate the first step entirely and substitute a dead roast with the ammonium carbonate step as the starting point, precipitation being effected as already described by $SO_2$. Iron sulphide, without any metals of value, can be substituted and thus the use of sulphide to separate copper from zinc or zinc from ammonium sulphate becomes unnecessary. Finally, the reaction between ammonia and sulphur dioxide can be used as herein described for the manufacture of ammonium sulphate without any connection whatsoever with any form of metallurgy. All such variations I consider as a part of this disclosure.

The presence of other metals, together with or in place of copper and zinc, constitutes another variant. Cobalt and nickel have properties and mineral affiliations which permits them to form the same type of solutions pertaining to copper and zinc and they would thus be extracted at the same time and co-precipitated in a similar manner. Manganese can be extracted in the first step and can then be precipitated as sulphide or carbonate, though it forms no compound similar to copper and zinc with ammonia or its carbonate. Similarly, molybdenum and vanadium have soluble ammonia compounds and may be extracted in said form. As long as the fixation of ammonia as its sulphate is the aim and object of the operation I consider such variants as disclosed herein a part of my process.

The simplicity of the conversion of ammonia into its carbonate has also been described. It is almost as simple to convert it to its sulphide. If a portion of the roaster gas be passed through a gas producer in place of a part of the steam customarily used to reduce ash clinkering such sulphur will issue as hydrogen sulphide in the gas stream. Scrubbing said gas with ammonia before its customary use will give all the sulphide required in my process. Such tactics is entirely orthodox and it is introduced here solely as desirable information. Parenthetically it may also be mentioned here that gaseous ammonia can replace the carbonated version which I have given, but nowhere near it in efficiency.

Having thus fully described my process, I claim:

1. The method of making ammonium sulphate which comprises; roasting an ore containing sulphides of iron, zinc and copper at such a temperature that approximately one-half of the copper-zinc content shall be present in the calcines as water soluble sulphate; leaching the calcines to produce a residue insoluble in water and a solution of sulphates of iron, zinc, and copper; oxidizing said solution and precipitating the contained iron by the addition of the necessary amount of a basic ammonia compound, selected from the group containing the carbonate, hydroxide and sulphide of ammonia; removing the resulting precipitate of ferric hydroxide and commingling the resultant solution with sufficient water-soluble sulphide to precipitate the resident copper as copper sulphide; separating said copper sulphide and reserving the resultant solution of zinc and ammonium sulphate for future treatment; re-roasting the leached residue from the first roasting step at a temperature sufficiently high to ensure complete oxidation of the resident sulphides; commingling said dead-roasted calcines with carbonated ammonia water in sufficient amount to produce complete solution of the still resident zinc and copper; separating the insoluble residue from the copper-zinc ammonium carbonate solution; purifying said solution from copper by adding the requisite amount of a soluble sulphide and separating the resultant precipitate of copper sulphide; commingling the resultant zinc solution with the one previously made and reserved for future treatment and separating the zinc carbonate produced thereby; commingling the resultant zinc containing solution of ammonium sulphate with gas from the roasting steps and with sufficient basic ammonia compound, selected from the group previously defined, to react therewith forming additional sulphate of ammonia and elemental sulphur; separating said sulphur; purifying the resultant ammonium sulphate solution from zinc by a further addition of a soluble sulphide and separating the precipitated zinc sulphide thus produced from the resultant solution of ammonium sulphate.

2. The method of making ammonium sulphate set forth in claim 1, with the added step that the roasting temperature of the first roast be so adjusted, in operation, that the liquor obtained on leaching the calcines from said roast be approximately sufficient to precipitate the resident metals in the ammonium carbonate solution derived from the second roasting step.

3. The method of making ammonium sulphate set forth in claim 1, with the added step that a portion of the ammonium sulphate solution, which constitutes its final product, be re-cycled to the first leaching step thus increasing the solvent power of the leach liquor and increasing the content of the final solution in ammonium sulphate.

ALFRED M. THOMSEN.

References Cited in the file of this patent

UNITED STATES PATENTS

| Number | Name | Date |
|---|---|---|
| 1,565,353 | Estelle | Dec. 15, 1925 |
| 1,925,739 | Vorlander | Sept. 5, 1933 |
| 1,936,866 | Van Ackeren | Nov. 28, 1933 |
| 1,992,572 | Harwist | Feb. 26, 1935 |
| 2,094,277 | Mitchell | Sept. 28, 1937 |
| 2,176,775 | Sweet | Oct. 17, 1939 |
| 2,392,385 | Hunter | Jan. 8, 1946 |
| 2,520,958 | Poole et al. | Sept. 5, 1950 |

OTHER REFERENCES

Prescott and Johnson: Qualitative Chemical Analysis (1901), 5th ed., pp. 182–190, Van Nostrand Co., New York, N. Y.